United States Patent
Kuraishi (10) Patent No.: US 9,958,025 B2
(45) Date of Patent: May 1, 2018

(54) STRUCTURE FOR ATTACHING COOLING FAN

(71) Applicant: SANYO DENKI CO., LTD., Tokyo (JP)

(72) Inventor: Daigo Kuraishi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 0 days. days.

(21) Appl. No.: 14/673,166

(22) Filed: Mar. 30, 2015

(65) Prior Publication Data

US 2015/0295472 A1    Oct. 15, 2015

(30) Foreign Application Priority Data

Apr. 10, 2014  (JP) .................. 2014-081407

(51) Int. Cl.
*F16F 15/08* (2006.01)
*H02K 9/04* (2006.01)

(52) U.S. Cl.
CPC .............. *F16F 15/08* (2013.01); *H02K 9/04* (2013.01)

(58) Field of Classification Search
CPC .... F04D 19/007; F04D 29/601; F04D 29/668; F16F 1/376; F16F 15/08; F01D 25/04; H02K 9/04; F01C 25/04
USPC ......... 188/379; 267/140, 141, 140.15, 141.4, 267/153, 139, 147; 248/188.8, 188.9, 248/188.91, 346.11, 560, 615, 677, 519; 417/363; 361/679.57, 679.58, 679.31, 361/679.36, 679.48, 679.46, 679.33, 685, 361/688, 690, 704, 807, 810, 694–695, 361/679.34, 679.35, 679; 174/138 E, 174/138 G; 415/213.1; 411/178, 292; 310/62–63
See application file for complete search history.

(56) References Cited

U.S. PATENT DOCUMENTS

| | | | | |
|---|---|---|---|---|
| 3,350,042 A | * | 10/1967 | Stewart ................. | F16F 1/3732 267/141.4 |
| 3,749,949 A | * | 7/1973 | Muller ..................... | H02K 9/04 310/112 |
| 4,074,156 A | * | 2/1978 | Widstrand ............... | H02K 9/06 165/47 |
| 4,452,417 A | * | 6/1984 | Krafthefer ............ | F16F 1/3732 248/604 |
| 4,511,310 A | * | 4/1985 | Pearce .................. | F04D 29/646 416/134 R |

(Continued)

FOREIGN PATENT DOCUMENTS

| | | |
|---|---|---|
| JP | 01232200 | 9/1989 |
| JP | 06-315248 | 11/1994 |

(Continued)

OTHER PUBLICATIONS

Japanese Office Action dated Aug. 15, 2017 for the corresponding Japanese Patent Application No. 2014-081407.

*Primary Examiner* — Robert A. Siconolfi
*Assistant Examiner* — San Aung
(74) *Attorney, Agent, or Firm* — Rankin, Hill & Clark LLP (57) ABSTRACT

A structure for attaching a cooling fan includes: a fan attachment plate interposed between a ventilation cover of a servomotor and the cooling fan and having a cut-out hole; and a tubular vibration-proof member supported by the cut-out hole of the fan attachment plate and fixed to the ventilation cover.

18 Claims, 5 Drawing Sheets

(56) References Cited

U.S. PATENT DOCUMENTS

| | | | | |
|---|---|---|---|---|
| 4,805,868 A | * | 2/1989 | Claude | F01P 5/04 165/122 |
| 4,819,503 A | * | 4/1989 | Fazi, Jr. | F16F 15/08 248/632 |
| 4,908,929 A | * | 3/1990 | Fazi, Jr. | F16F 15/08 29/469.5 |
| 5,026,476 A | * | 6/1991 | Ishimoto | H02K 5/24 181/202 |
| 5,051,636 A | * | 9/1991 | Ishimoto | H02K 5/24 310/51 |
| 5,153,052 A | * | 10/1992 | Tanaka | A47B 91/06 108/156 |
| 5,165,846 A | * | 11/1992 | Possell | F04D 17/161 415/182.1 |
| 5,335,893 A | * | 8/1994 | Opp | B64C 1/066 248/632 |
| 5,406,156 A | * | 4/1995 | Somers | H02K 5/04 310/89 |
| 5,449,153 A | * | 9/1995 | Catalano | F04D 29/668 267/141.2 |
| 5,788,566 A | * | 8/1998 | McAnally | H05K 7/20172 361/695 |
| 5,944,487 A | * | 8/1999 | Pearce | F04D 25/088 29/889.3 |
| 6,017,185 A | * | 1/2000 | Kuo | F04D 29/582 165/121 |
| 6,247,686 B1 | * | 6/2001 | Gabbin | F16F 1/3732 267/147 |
| 6,351,380 B1 | * | 2/2002 | Curlee | F16B 5/065 165/80.3 |
| 6,894,897 B1 | * | 5/2005 | Nagurny | H05K 7/20172 165/122 |
| 6,915,993 B2 | * | 7/2005 | O'Leary | A47B 91/06 248/188.8 |
| 7,234,199 B2 | * | 6/2007 | Bushey | A47B 91/06 16/42 R |
| 2002/0084400 A1 | * | 7/2002 | Ribeiro | H05K 7/142 248/519 |
| 2006/0227514 A1 | * | 10/2006 | Kang | H04N 5/7458 361/719 |
| 2007/0086162 A1 | * | 4/2007 | Chang | F04D 25/0613 361/695 |
| 2007/0120301 A1 | * | 5/2007 | Domen | F16F 1/3732 267/152 |
| 2007/0153477 A1 | * | 7/2007 | Liang | G06F 1/20 361/695 |
| 2007/0237602 A1 | * | 10/2007 | Xia | F16B 19/004 411/178 |
| 2010/0027231 A1 | * | 2/2010 | Chang | F16F 1/3732 361/807 |
| 2010/0225184 A1 | * | 9/2010 | Yuan | H02K 9/14 310/62 |

FOREIGN PATENT DOCUMENTS

| | | |
|---|---|---|
| JP | 10014169 A2 | 1/1998 |
| JP | 2005036499 A2 | 2/2005 |
| JP | 2008236982 A2 | 10/2008 |
| JP | 2013062898 A2 | 4/2013 |
| JP | 2013240222 A2 | 11/2013 |

* cited by examiner

STRUCTURE FOR ATTACHING COOLING FAN

CROSS-REFERENCE TO RELATED APPLICATION

This application claims priority from Japanese Patent Application No, 2014-081407 filed with the Japan Patent Office on Apr. 10, 2014, the entire content of which is hereby incorporated by reference.

BACKGROUND

1. Technical Field

The present disclosure relates to a structure for attaching a cooling fan.

2. Description of the Related Art

A servomotor is known as a motor that can control a position, speed, and the like by using a servomechanism. The servomotor is used for, for example, driving a loading device such as a speed reducer or a hydraulic pump. When a temperature of a coil is increased by drive of the servomotor, the capability of the servomotor is reduced.

Therefore, the servomotor is provided with a cooling fan for suppressing the increase in temperature of the coil. Conventionally, the cooling fan is fixed directly or fixed via a metal fitting to a casing or a bracket of the servomotor.

A technique regarding a structure for attaching the cooling fan of the servomotor is disclosed in, for example, JP-A-6-315248. In an AC servomotor disclosed in this publication, a cooling fan is attached to a bracket of a servomotor via a metal fitting.

SUMMARY

A structure for attaching a cooling fan includes: a fan attachment plate interposed between a ventilation cover of a servomotor and the cooling fan and having a cut-out hole; and a tubular vibration-proof member supported by the cut-out hole of the fan attachment plate and fixed to the ventilation cover.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a conventional structure for attaching a cooling fan, excessive vibration from a loading device and excessive vibration caused by resonance between a vibrational frequency of the loading device and a natural frequency of a cooling fan support portion are applied to the cooling fan. When the excessive vibration is applied to the cooling fan, the cooling fan may be damaged.

An object of the present disclosure is to provide a structure for attaching a cooling fan, the structure being capable of preventing or suppressing damage due to excessive vibration by reducing vibration applied from a loading device driven by a servomotor and vibration caused by resonance between a vibrational frequency of the loading device and a natural frequency of a cooling fan support portion.

A structure for attaching a cooling fan according to an embodiment of the present disclosure (the present structure for attaching a cooling fan) includes: a fan attach plate interposed between a ventilation cover of a servomotor and the cooling fan and having a cut-out hole, and a tubular vibration-proof member supported by the cut-out hole of the fan attachment plate and fixed to the ventilation cover.

In the present structure for attaching the cooling fan, the cooling fan is fixed to the ventilation cover via the vibration-proof member. In other words, the vibration-proof member is interposed between the ventilation cover of the servomotor and the cooling fan. This makes it possible to attenuate vibration transmitted from a loading device to the cooling fan.

By appropriately selecting the material, the size, and, the number of the vibration-proof members and the material of the attachment plate, it is possible to regulate a natural frequency of a cooling fan support portion. As a result, it is possible to prevent or suppress resonance between a vibrational frequency from the loading device and the natural frequency of the cooling fan support portion.

Therefore, with the present structure for attaching the cooling fan, it is possible to prevent or suppress the damage of the cooling fan caused by excessive vibration.

In the following, a structure for attaching a cooling fan according to first and second embodiments will be described with reference to the drawings.

In the structure for attaching the cooling fan according to the first and second embodiments, a vibration-proof member is interposed between a casing of a servomotor and the cooling fan (i.e., a fan for cooling). Therefore, the structure for attaching the cooling fan according to these embodiments can reduce vibration applied from a loading device driven by the servomotor and vibration generated by resonance between a vibrational frequency of the loading device and a natural frequency of a cooling fan support portion. As a result, according to the first and second embodiments, it is possible to provide the structure for attaching the cooling fan, which can avoid or suppress the damage of the cooling fan due to excessive vibration.

First Embodiment

[Configuration of Structure for Attaching Cooling Fan]

Figure 1:
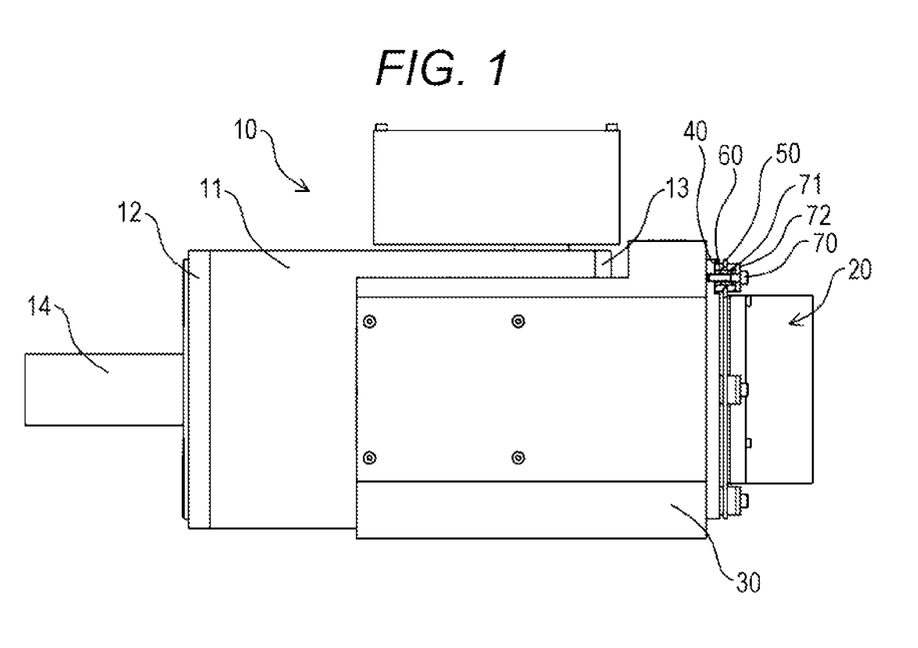
FIG. 1 is a front view of a structure for attaching a cooling fan according to a first embodiment.
Figure 2:
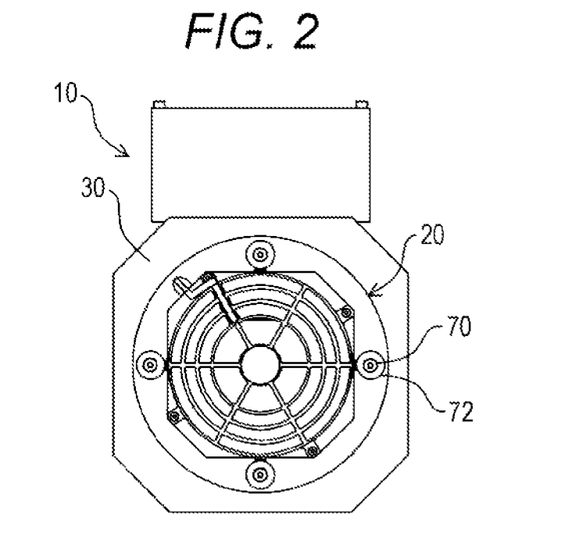
FIG. 2 is a view illustrating an anti-output-side end face of the structure for attaching the cooling fan according to the first embodiment.
Figure 3:
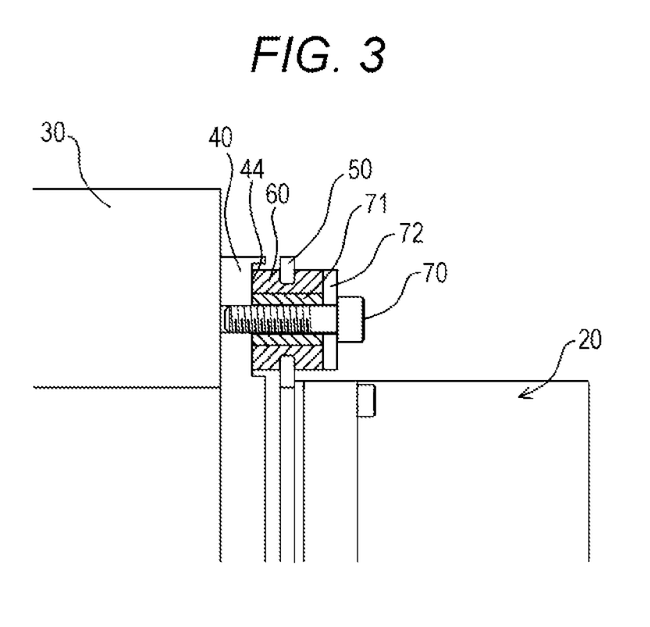
FIG. 3 is an enlarged view illustrating a main part of the structure for attaching the cooling fan according to the first embodiment.

The configuration of the structure for attaching the cooling fan according to the first embodiment will be described with reference to FIGS. 1 to 6. FIG. 1 is a front view of the structure for attaching the cooling fan according to the first embodiment. FIG. 2 is a view illustrating an anti-output-side end face of the structure for attaching the cooling fan according to the first embodiment. FIG. 3 is an enlarged view illustrating a main part of the structure for attaching the cooling fan according to the first embodiment.

As illustrated in FIGS. 1 and 2, the structure for attaching the cooling fan according to the first embodiment is a structure for attaching a cooling fan 20 for cooling a servomotor 10 to the servomotor 10.

The servomotor 10 includes a stator and a rotor (not shown) in a frame 11. An output-side bracket 12 is provided to an output-side end portion of the frame 11. Meanwhile, an anti-output-side bracket 13 is provided to an anti-output-side end portion of the frame 11.

A rotary shaft 14 of the servomotor 10 is exposed to the outside from the output-side bracket 12. The rotary shaft 14 is connected to a loading device such as a speed reducer or a hydraulic pump. The servomotor 10 controls the position, the speed, and the like of the loading device by using a servomechanism.

The cooling fan 20 is a cooling device for preventing or suppressing the increase in temperature of a coil (not shown) of the servomotor 10. The cooling fan 20 includes a stator and a rotor (not shown) and is also referred to as a fan motor. The cooling fan 20 includes the rotor and an impeller (not shown) having a plurality of blades attached to the rotor.

A tubular ventilation cover 30 is attached to AB anti-output side of the servomotor 10 so as to cover the anti-output-side bracket 13. The ventilation cover 30 of this embodiment is thrilled as, for example, a substantially octagon-shaped tube. The shape of the ventilation cover 30, however, is not limited thereto. As illustrated in FIG. 3, the cooling fan 20 is attached to the ventilation cover 30 via a base plate 40, a fan attachment plate 50, and a vibration-proof member 60.

Figure 4A:
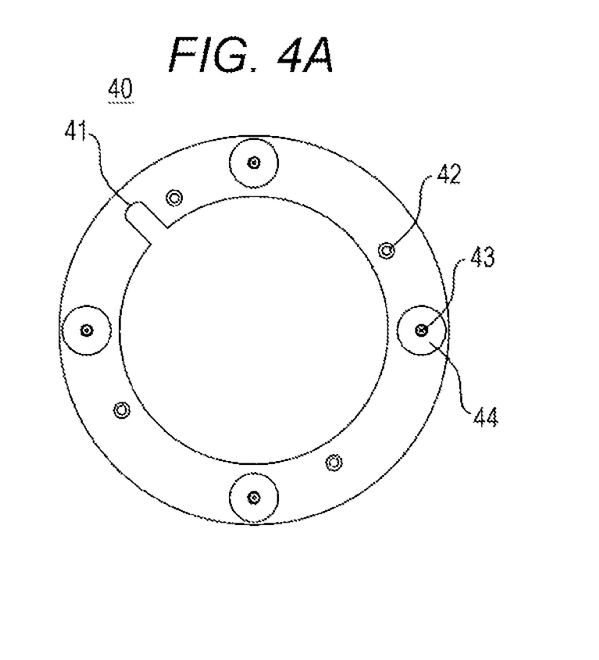
FIGS. 4A and 4B are plan views illustrating a base plate in the first embodiment.
Figure 4B:
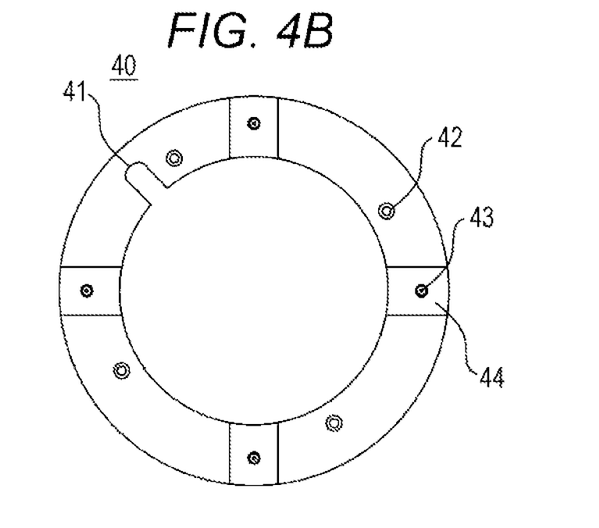

The base plate of the first embodiment will be described with reference to FIGS. 4A and 4B. FIGS. 4A and 4B are plan views illustrating the base plate in the first embodiment.

As illustrated in FIGS. 4A and 4B, the base plate 40 is formed from a ring-shaped metal plate material. The base plate 40 of this embodiment is made of, for example, the same material as that of the anti-output-side bracket 13 (e.g., aluminum or aluminum alloy). The material for forming the base plate 40 is not necessarily limited to aluminum or aluminum alloy.

A positioning groove portion 41 is formed in a part of an inner diameter of the base plate 40. A plurality of insertion holes 42 is formed in the base plate 40 to fix the base plate 40 to the ventilation cover 30 with screws (not shown). Four insertion holes 42 are formed in the base plate 40 of this embodiment. However, the number of insertion holes 42 to be formed in the base plate 40 is not limited.

Further, a plurality of female screw portions 43 screwed with an attachment bolt 70 is formed in the base plate 40 (see FIG. 3). In order to screw the attachment bolt 70, the base plate 40 is formed to be thicker than the later-described fan attachment plate 50. Recessed counter bored portions 44 are formed around the female screw portions 43. The counter bored portions 44 of FIG. 4A are formed as ring-shaped recesses. The counter bored portions 44 of FIG. 4B are formed as substantially quadrangular recesses. Four female screw portions 43 are formed in the base plate 40 of this embodiment. However, the number of female screw portions 43 to be formed in the base plate 40 is not limited.

As described above, the base plate 40 is fixed to the ventilation cover 30 between the fan attachment plate 50 and the ventilation cover 30 (see FIG. 3). The base plate 40 further has the female screw portions 43 screwed with the attachment bolt 70.

Figure 5:
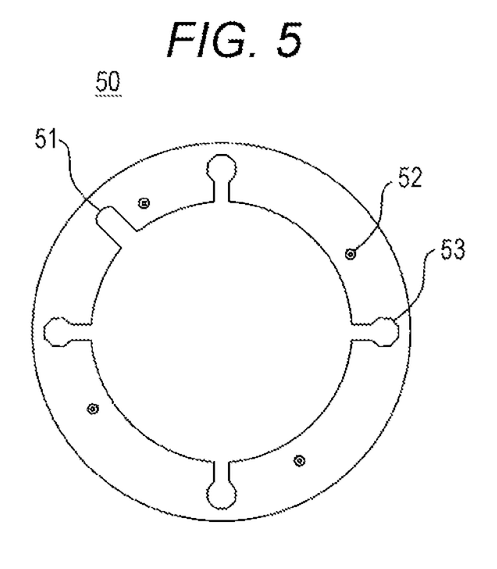
FIG. 5 is a plan view illustrating a fan attachment plate in the first embodiment.

Next, the fan attachment plate of the first embodiment will be described with reference to FIG. 5. FIG. 5 is a plan view illustrating the fan attachment plate in the first embodiment.

As illustrated in FIG. 5, the fan attachment plate 50 is formed from a ring-shaped metal plate material. The fan attachment plate 50 of this embodiment is formed from, for example, a cold rolled steel plate such as SPCC. However, the material for forming the fan attachment plate 50 is not necessarily limited to SPCC.

A positioning groove portion 51 is formed in a part of an inner diameter of the fan attachment plate 50. A plurality of insertion holes 52 is formed in the fan attach plate 50 to fix the cooling fan 20 to the fan attachment plate 50 with screws. Four insertion holes 52 are formed in the fan attachment plate 50 of this embodiment. However, the number of insertion holes 52 to be formed in the fan attachment plate 50 is not limited.

Further, a plurality of cut-out holes 53 for supporting the tubular vibration-proof member 60 is formed in the fan attachment plate 50 (see FIG. 3). Four cut-out holes 53 are formed in the fan attachment plate 50 of this embodiment. However, the number of cut-out holes 53 to be formed in the fan attachment plate 50 is not limited.

By positioning the base plate 40 and the fan attachment plate 50 with reference to the respective positioning groove portions 41 and 51, each insertion hole 42 of the base plate 40 and the corresponding insertion hole 52 of the fan attachment plate 50 are consecutively provided in an axial direction such that the central axes of the holes coincide with each other and each female screw portion 43 of the base plate 40 and the corresponding cut-out hole 53 of the fan attachment plate 50 are consecutively provided in the axial direction such that the central axes of the holes coincide with each other.

Figure 6:
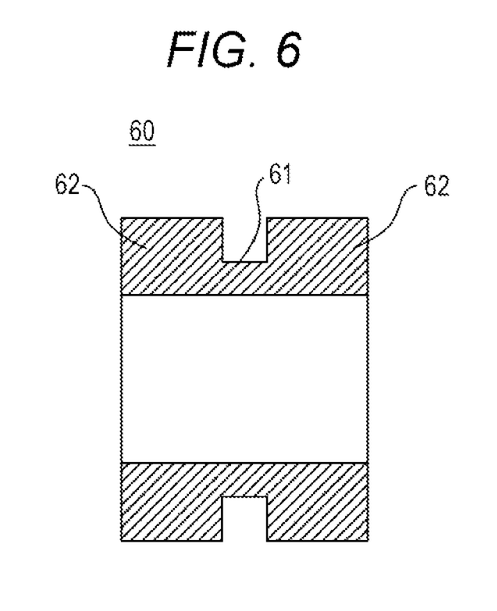
FIG. 6 is an axial sectional view illustrating a vibration-proof member (grommet) in the first embodiment.

Next, the vibration-proof member of the first embodiment will be described with reference to FIG. 6. FIG. 6 is an axial sectional view illustrating the vibration-proof member 60 (grommet) in the first embodiment.

As illustrated in FIGS. 1, 3, and 6, the cooling fan 20 is fixed to the ventilation cover 30 via the tubular vibration-proof member 60. The vibration-proof member 60 of this embodiment is formed from, for example, a stepped vibration-proof member. As illustrated in FIG. 6, the stepped vibration-proof member 60 is formed to include a cylindrical portion 61 and ring-plate portions 62 and 62 arranged at both ends thereof. The stepped vibration-proof member 60 is, for example, a grommet made of rubber. The material for forming the stepped vibration-proof member 60, however, is not limited to the exemplified material as long as the stepped vibration-proof member 60 has a vibration-proof property.

The stepped vibration-proof member 60 is supported by the cut-out holes 53 of the fan attachment plate 50. The cylindrical portion 61 of the stepped vibration-proof member 60 is inserted into the cut-out hole 53 of the fan attachment plate 50. The ring-plate portions 62 and 62 sandwich a part around the cut-out hole 53 of the fan attachment plate 50.

As illustrated in FIG. 3, the attachment bolt 70 is inserted into the stepped vibration-proof member 60 supported by the fan attachment plate 50. Further, the attachment bolt 70 is screwed with the female screw portions 43 of the base plate 40. The stepped vibration-proof member 60 is placed in the counter bored portions 44 around the female screw portions 43 of the base plate 40. By placing the stepped vibration-proof member 60 in the recessed counter bored portions 44, a gap between the base plate 40 and the fan attachment plate 50 can be reduced as much as possible. Thus, the leakage of air flowing from the cooling fan 20 toward the ventilation cover 30 through the gap is suppressed. A metal sleeve 71 is inserted to be fitted in the cylindrical portion 61 of the stepped vibration-proof member 60. The ring-plate portion 62 on the cooling fan side of the stepped vibration-proof member 60 serves as a seat portion of the attachment bolt 70. Therefore, a metal washer 7 is inserted to be fitted between the ring-plate portion 62 and a head portion of the attachment bolt 70. As described above, in a state where the metal washer 72 and the metal sleeve 71 are inserted to be fitted to the stepped vibration-proof member 60, the attachment bolt 70 is inserted into the stepped vibration-proof member 60 and is screwed with the female screw portions 43 of the base plate 40. Thus, the damage of the stepped vibration-proof member 60 can be prevented or suppressed. In addition, by adjusting the height (length) of the sleeve 71, a pressing rate of the stepped vibration-proof member 60 can be also controlled.

[Action of Vibration-Proof Structure of Fan Motor]

An action of the structure for attaching the cooling fan according to the first embodiment will be described with reference to FIGS. 1 to 5.

As illustrated in FIGS. 1 to 3, in the structure for attaching the cooling fan according to the first embodiment, the tubular vibration-proof member 60 is interposed between the ventilation cover 30 of the servomotor 10 and the cooling fan 20. The base plate 40 shaped like a ring place and having the female screw portions 43 is attached to the ventilation cover 30. The fan attachment plate 50 shaped like a ring plate and having the insertion holes 52 is attached to the base plate 40. The vibration-proof member 60 is inserted to be fixed to the cut-out holes 53 of the fan attachment plate 50.

The base plate 40 and the fan attachment plate 50 have the positioning groove portions 41 and 51, respectively. By positioning the base plate 40 and the fan attachment plate 50 with reference to the respective positioning groove portions 41 and 51, each female screw portion 43 of the base plate 40 and the corresponding cut-out hole 53 of the fan attachment plate 50 are consecutively provided in the axial direction such that the central axes of the holes coincide with each other. That is, the positioning groove portions 41 and 51 are portions for causing the central axis of the female screw portion 43 of the base plate 40 and the central axis of the cut-out hole 53 of the fan attachment plate 50 to coincide with each other.

As illustrated in FIG. 6, the vibration-proof member 60 is, for example, a stepped vibration-proof member. The stepped vibration-proof member 60 is formed to include the cylindrical portion 61 and the ring-plate portions 62 and 62 arranged at the both ends thereof. Thus, by entry of the cylindrical portion 61 of the stepped vibration-proof member 60 into each cut-out hole 53 of the fan attachment plate 50, a part around the cut-out hole 53 of the fan attachment plate 50 can be held by the ring-plate portions 62 and 62. The stepped vibration-proof member 60 is preferably a grommet.

In the structure for attaching the cooling fan according to the first embodiment, the vibration-proof member 60 is interposed between the ventilation cover 30 of the servomotor 10 and the cooling fan 20. That is, the vibration-proof member 60 is fixed to the ventilation cover 30 via the base plate 40. The vibration-proof member 60 is further fixed to the cooling fan 20 via the fan attachment plate 50. Therefore, vibration transmitted from the loading device to the cooling fan 20 can be attenuated. By using the rubber grommet as the vibration-proof member 60, a vibration-proof effect can be enhanced. By placing the stepped vibration-proof member 60 in the recessed counter bored portion 44, the gap between the base plate 40 and the fan attachment plate 50 is reduced. This makes it possible to prevent or suppress the leakage of air flowing from the cooling fan 20 toward the ventilation cover 30 through the gap.

By appropriately selecting the material, the size, and the number of the vibration-proof members 60 and the materials of the base plate 40 and the fan attachment plate 50, it is possible to regulate a natural frequency of a cooling fan support portion. As a result, it is possible to prevent or suppress resonance between a vibrational frequency from the loading device and the natural frequency of the cooling fan support portion.

The structure for attaching the cooling fan according to the first embodiment is a structure in which the cooling fan can be also attached as it is to the servomotor 10 that has been already shipped. In this attachment structure, the cooling fan 20 is not easily dropped off even if the stepped vibration-proof member 60 such as a rubber grommet is damaged. Furthermore, in this attachment structure, the entire length of the servomotor 10 is not superfluously increased.

With the structure for attaching the cooling fan according to the first embodiment, the vibration applied from the loading device driven by the servomotor 10 and the vibration generated by the resonance between the vibrational frequency of the loading device and the natural frequency of the cooling fan support portion can be reduced by the attenuation effect of the stepped vibration-proof member 60 such as a rubber grommet. As a result, it is possible to prevent or suppress the damage of the cooling fan caused by excessive vibration.

Therefore, with the structure for attaching the cooling fan according to the first embodiment, it is possible to prevent or suppress the damage of the cooling fan 20 caused by excessive vibration.

Second Embodiment

Figure 7:
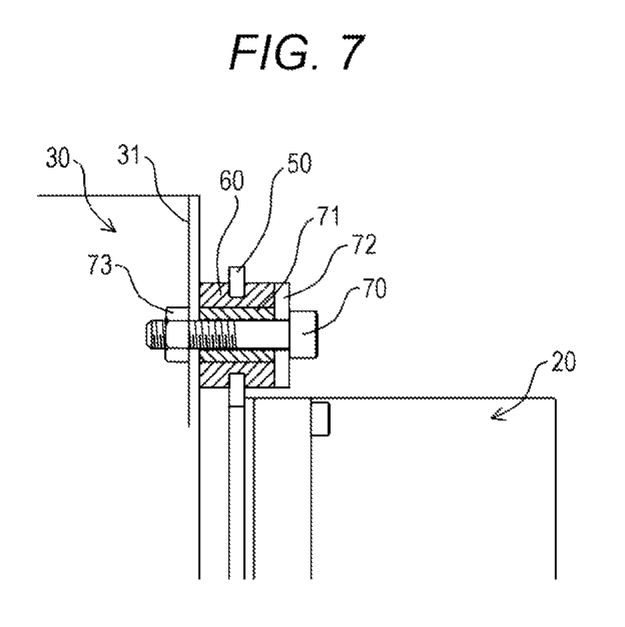
FIG. 7 is an enlarged view illustrating a main part of a structure for attaching a cooling fan according to a second embodiment.

Next, a structure for attaching a cooling fan according to the second embodiment will be described with reference to FIG. 7. FIG. 7 is an enlarged view illustrating a main part of the structure for attaching the cooling fan according to the second embodiment. In the second embodiment, components having the same configurations as those in the first embodiment will be designated by the same reference numerals.

As illustrated in FIG. 7, the second embodiment is different from the first embodiment in that the structure for attaching the cooling fan according to the second embodiment does not have a base plate and the attachment bolt 70 is fixed with a nut 73.

That is, the structure for attaching the cooling fan according to the second embodiment does not have the base plate (see FIGS. 1, 3, 4A, and 4B). Further, a though hole (not shown), which allows the attachment bolt 70 to be inserted into an end plate 31 on the cooling fan 20 side of the ventilation cover 30, is bored. In the structure for attaching the cooling fan according to the second embodiment, the attachment bolt 70 is inserted into the stepped vibration-proof member 60 supported by the fan attachment plate 50 and the though hole of the end plate 31 of the ventilation cover 30. The attachment bolt 70 is screwed with the nut 73 from the inside of the end plate 31. In other words, in the second embodiment, the stepped vibration-proof member 60 is fixed to the ventilation cover 30. The stepped vibration-proof member 60 is further fixed to the cooling fan 20 via the fan attachment plate 50.

The metal sleeve 71 is inserted to be fitted in the cylindrical portion 61 of the stepped vibration-proof member 60. The ring-plate portion 62 on the cooling fan side of the stepped vibration-proof member 60 serves as a seat portion of the attachment bolt 70. Therefore, the metal washer 72 is inserted to be fitted between the ring-plate portion 62 and the head portion of the attachment bolt 70.

The structure for attaching the cooling fan according to the second embodiment basically has similar advantageous effects to those of the first embodiment. In particular, with the structure for attaching the cooling fan according to the second embodiment, the attachment bolt 70 is fixed to the ventilation cover 30 with the nut 73. Accordingly, the attachment structure does not need to have an aluminum base plate. Thus, as compared with the first embodiment, the attachment structure has the advantageous effects of reducing the production cost and the weight.

Preferred embodiments of the present disclosure are described above. However, the foregoing description is intended only for illustration of the present disclosure, and is not intended to limit the technical scope of the present disclosure to the foregoing embodiments. The technique of the present disclosure can be carried out in various modes different from the foregoing embodiments without deviating from the gist of the present disclosure.

Further, a structure for attaching a cooling fan of the present disclosure may be first to sixth structures for attaching a cooling fan as described below.

The first structure for attaching a cooling fan, which is a structure for attaching a cooling fan to attach the cooling fan to a ventilation cover of a servomotor, includes: a fan attachment plate interposed between the ventilation cover and the cooling fan and having a cut-out hole; and a tubular vibration-proof member supported by the cut-out hole of the fan attachment plate, wherein the cooling fan is fixed to the ventilation cover via the vibration-proof member.

In the second structure for attaching the cooling fan in the first structure for attaching the cooling fan, an attachment bolt inserted into the tubular vibration-proof member is inserted into the ventilation cover, and the attachment bolt is fixed by screwing the attachment bolt with a nut from inside of the ventilation cover.

The third structure for attaching the cooling fan in the first structure for attaching the cooling fan includes a base plate having a female screw portion on the ventilation cover side of the fan attachment plate, and the attachment bolt inserted into the tubular vibration-proof member is screwed to be fixed to the female screw portion.

In the fourth structure for attaching the cooling fan in the third structure for attaching the cooling fan, the base plate and the fan attachment plate have respective positioning groove portions, and the female screw portion of the base plate and the cut-out hole of the fan attachment plate are consecutively provided in the axial direction such that central axes of the holes coincide with each other by the positioning groove portions.

In the fifth structure for attaching the cooling fan in any one of the first to fourth structures for attaching the cooling fan, the vibration-proof member is a stepped vibration-proof member having ring-plate portions at both ends of a cylindrical portion.

In the sixth structure for attaching the cooling fan in the fifth structure for attaching the cooling fan, the stepped vibration-proof member is a rubber grommet.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A structure for attaching a cooling fan, comprising:
a fan attachment plate interposed between a ventilation cover of a servomotor and the cooling fan and having plural cut-out holes;
plural tubular vibration-proof members, a center of each of the plural tubular vibration-proof members, in a direction of an axis of the each of the plural tubular vibration-proof members, being supported by each of the plural cut-out holes of the fan attachment plate and the plural tubular vibration-proof members being fixed to the ventilation cover; and
attachment bolts to be inserted into the plural vibration-proof members and the ventilation cover,
wherein the fan attachment plate is a ring-shaped plate having an opening;
the plural cut-out holes are connected to the opening of the fan attachment plate; and
each of the plural tubular vibration-proof members is in direct contact with the ventilation cover.

2. The structure for attaching the cooling fan according to claim 1, further comprising:
a nut to be screwed with the attachment bolt from inside of the ventilation cover.

3. A structure for attaching a cooling fan, comprising:
a fan attachment plate interposed between a ventilation cover of a servomotor and the cooling fan and having a cut-out hole; and
a tubular vibration-proof member supported by the cut-out hole of the fan attachment plate and fixed to the ventilation cover,
an attachment bolt to be inserted into the vibration-proof member; and
a base plate fixed to the ventilation cover between the fan attachment plate and the ventilation cover and having a female screw portion to be screwed with the attachment bolt,
wherein the fan attachment plate is a ring-shaped plate having an opening;
the cut-out hole is connected to the opening of the fan attachment plate;
the base plate is a ring-shaped plate having an opening;
the tubular vibration-proof member is in direct contact with the base plate;
the base plate is in direct contact with the ventilation cover.

4. The structure for attaching the cooling fan according to claim 3, wherein the base plate and the fan attachment plate respectively have positioning groove portions for causing a central axis of the female screw portion of the base plate and a central axis of the cut-out hole of the fan attachment plate to coincide with each other, and the positioning groove portions are connected to the opening of the base plate.

5. The structure for attaching the cooling fan according to claim 1, wherein each of the plural vibration-proof members is a stepped vibration-proof member having a cylindrical portion and ring-plate portions arranged at both ends of the cylindrical portion.

6. The structure for attaching the cooling fan according to claim 2, wherein each of the plural vibration-proof members is a stepped vibration-proof member having a cylindrical portion and ring-plate portions arranged at both ends of the cylindrical portion.

7. The structure for attaching the cooling fan according to claim 3, wherein the vibration-proof member is a stepped vibration-proof member having a cylindrical portion and ring-plate portions arranged at both ends of the cylindrical portion.

8. The structure for attaching the cooling fan according to claim 4, wherein the vibration-proof member is a stepped vibration-proof member having a cylindrical portion and ring-plate portions arranged at both ends of the cylindrical portion.

9. The structure for attaching the cooling fan according to claim 5, wherein each of the plural stepped vibration-proof members is a rubber grommet.

10. The structure for attaching the cooling fan according to claim 6, wherein each of the plural stepped vibration-proof members is a rubber grommet.

11. The structure for attaching the cooling fan according to claim 7, wherein the stepped vibration-proof member is a rubber grommet.

12. The structure for attaching the cooling fan according to claim 8, wherein the stepped vibration-proof member is a rubber grommet.

13. The structure for attaching the cooling fan according to claim 3, wherein the base plate has a counter bored portion around the female screw portion, the counter bored portion being a ring shape as viewed parallel to an axial direction of the female screw portion.

14. The structure for attaching the cooling fan according to claim 3, wherein the plate has a counter bored portion around the female screw portion, the counter bored portion being a quadrangular shape as viewed parallel to an axial direction of the female screw portion.

15. The structure for attaching the cooling fan according to claim 1, wherein each of the plural cut-out holes is connected to the opening of the fan attachment plate via a groove, each of the plural tubular vibration-proof members is supported by each of the plural cut-out holes of the fan attachment plate.

16. The structure for attaching the cooling fan according to claim 1, wherein the plural cut-out holes are located at equal intervals radially from a center of the fan attachment plate.

17. The structure for attaching the cooling fan according to claim 1, wherein when viewed parallel to the axis of the each of the plural tubular vibration-proof members, the axis of the each of the plural tubular vibration-proof members is located at each of a center of the cut-out holes of the fan attachment plate.

18. The structure for attaching the cooling fan according to claim 5, wherein when viewed parallel to the axis of the each of the plural tubular vibration-proof members, an axis of each of the cylindrical portions of the stepped vibration-proof members is located at each of a center of the cut-out holes of the fan attachment plate.

\* \* \* \* \*